United States Patent [19]

Murray

[11] Patent Number: 5,560,412

[45] Date of Patent: Oct. 1, 1996

[54] RAFTER ARM SLIDE FOR RETRACTABLE AWNING

[75] Inventor: Brent W. Murray, Longmont, Colo.

[73] Assignee: Carefree/Scott Fetzer Company, Broomfield, Colo.

[21] Appl. No.: 499,140

[22] Filed: Jul. 7, 1995

[51] Int. Cl.⁶ .................................................. E04F 10/06
[52] U.S. Cl. .................................................. 160/67; 160/71
[58] Field of Search .................................. 160/67, 68, 66, 160/71, 80, 69, 78, 79, 22; 135/89

[56] References Cited

U.S. PATENT DOCUMENTS

| | | | |
|---|---|---|---|
| 4,759,396 | 7/1988 | Quinn | 160/66 |
| 4,819,707 | 4/1989 | Watson et al. | |
| 5,148,848 | 9/1992 | Murray et al. | 160/66 X |
| 5,172,743 | 12/1992 | Wallace et al. | 160/71 X |
| 5,472,007 | 12/1995 | Malott | 160/66 X |

*Primary Examiner*—David M. Purol
*Attorney, Agent, or Firm*—Gary M. Polumbus

[57] ABSTRACT

A slide system for interconnecting the outer end of a rafter arm to an associated support arm in a retractable awning includes a slide member pivotally connected to the outer end of a rafter arm and also pivotally and slidably connected to the associated support arm to permit the two arms to become skewed during extension and retraction of the awning. The system further includes an automatic catch system to releasably secure the slide member to the outer end of a support arm in a manner such that it can be quickly released for retraction of the awning.

12 Claims, 6 Drawing Sheets

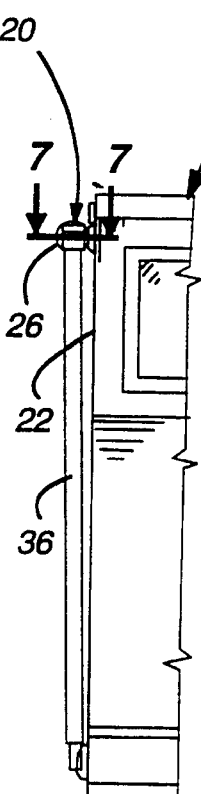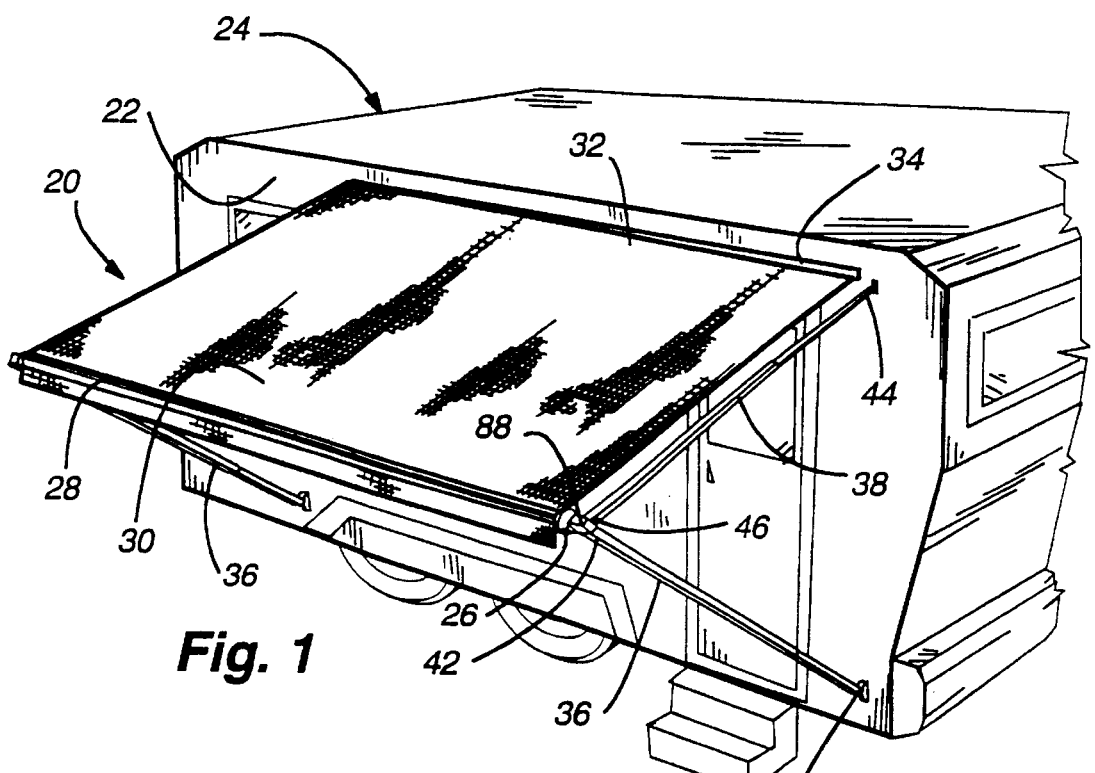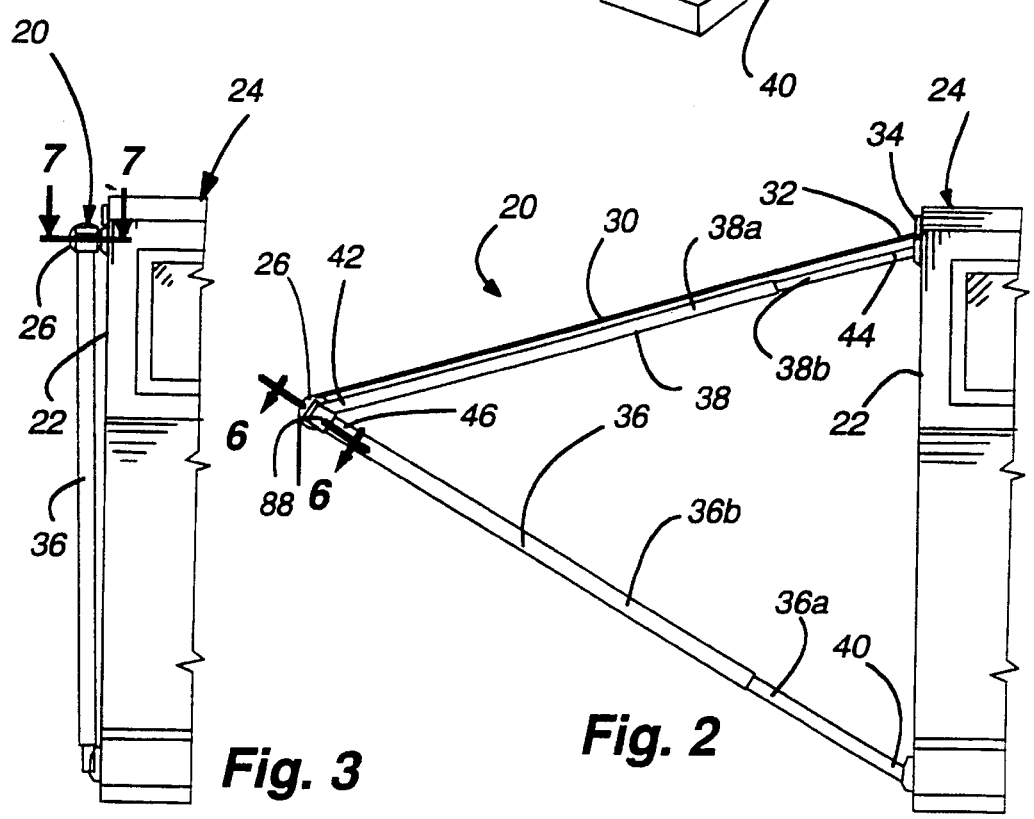
Fig. 1
Fig. 3
Fig. 2

RAFTER ARM SLIDE FOR RETRACTABLE AWNING

BACKGROUND OF THE INVENTION

1. Field of the Invention

The present invention relates generally to retractable awnings of the type adapted to be mounted on a substantially vertical support surface having a roll bar supported by a pair of support arms and rafter arms for moving the awning between extended and retracted positions, and more particularly to an improved slide member for slidably connecting one end of a rafter arm to an associated support arm.

2. Description of the Known Art

Retractable awnings of the type which are adapted to be mounted on a substantially vertical support surface have been in use for many years with early primary uses being to cover windows, doors and the like of commercial or residential establishments. In more recent years, such awnings have been used on recreational vehicles, mobile homes and the like wherein different problems are encountered and, accordingly, design changes have needed to be made.

Most retractable awnings include a pair of support arms which carry a roll bar on their outer end around which the canopy for the awning can be rolled and unrolled. In addition, rafter arms are provided which extend beneath opposite side edges of the canopy and have outer ends slidably connected to the support arms to brace the awning in its extended position. Many current day retractable awnings are designed so that the support arms have a channel-shaped configuration into which an associated rafter arm can be nested when the awning is in its retracted position. A slide member has been used to interconnect a rafter arm to an associated support arm with the slide member being adapted to slide along the length of the support arm during movement of the awning between extended and retracted positions.

Typically, the support arms have an inner end connected to a support surface while the opposite or outer end is connected to the roll bar. Similarly, one edge of an awning canopy is connected to the same support surface while the opposite edge is connected to the roll bar such that pivotal movement of the support arms away from the support surface causes the awning canopy to unroll from the roll bar until it is fully extended away from the support surface. An inner end of each rafter arm is also pivotally connected to the support surface, vertically above the connection of the support arm to the support surface, with the outer end of the rafter arm having the slide member attached thereto.

When moving the awning from the retracted position adjacent to the support surface to an extended position, the roll bar is initially allowed to move away from the support surface as the support arms are pivoted away from the support surface. Subsequently, the slide members on the outer end of the rafter arms are moved along the length of the support arms until they reach the outer end of the support arms. Systems have been employed for retaining the slide members at the outer ends of the support arms and such systems are of importance from the standpoint of rendering the awning "user friendly".

One problem with retractable awnings of the type described resides in the fact that after the slide members have been moved to the outer end of the associated support arms, the support arms, which are longitudinally extendable, need to be extended to place the roll bar in an elevated condition, but unless there are two operators for extending the support arms at opposite ends of the awning simultaneously, the elevation of one end of the roll bar before the other end places a strain in the sliding joint between the support arm and the rafter arm. Further, the systems for securing the slide member at the outer end of an associated support arm have been criticized for being difficult to operate when manipulating the relatively heavy awnings.

It is to overcome the shortcomings in prior art systems and to provide a new and improved system for moving a retractable awning between retracted and extended positions that the present invention has been developed.

SUMMARY OF THE INVENTION

The present invention relates generally to an improved slide system for interconnecting the free end of a rafter arm to an associated support arm in a retractable awning. More specifically, the slide system includes an improved mechanism for releasably securing the slide member at the outer end of an associated support arm and also a pivotal mechanism interconnecting the slide member with the support arm to accommodate skewed relationships of the rafter arm relative to the associated support arm.

Many retractable awnings are mountable on vertical supporting surfaces such as might be found on residential or commercial building structures, recreational vehicles, mobile homes, travel trailers and the like. Such awnings typically include a roll bar having an outer edge of an awning canopy secured thereto with the inner edge of the canopy secured to the vertical support surface. At opposite ends of the roll bar, a support arm and a rafter arm are adapted to support the roll bar in an extended or retracted position of the awning. In the retracted position of the awning, the roll bar is disposed adjacent the support surface with the awning canopy wrapped therearound and the rafter arm and associated support arm vertically disposed adjacent to or nested with each other at the support surface. Each support arm has an inner end pivotally and releasably connected to the support surface while the outer end is pivotally connected to an associated end of the roll bar. The rafter arm, on the other hand, has an inner end pivotally connected to the support surface, in vertical alignment above the connection of the associated support arm, and an outer end connected to the support arm with a slide member that forms a part of the slide system.

The support arm in the disclosed embodiment is of channel shaped configuration so as to receive the associated rafter arm in nested relationship therewith when the awning is in the retracted position. The slide member is pivotally secured to the rafter arm and is also pivotally connected in a slidable manner with one longitudinal edge of the support arm so as to be pivotal about that edge. In this manner, if the rafter arm and the support arm become skewed during extension or retraction of the awning, the slide member pivots relative to the support arm to accommodate any misalignment of the arms thereby preventing stress in the connection between the two arms.

The slide system also includes an improved mechanism for retaining the slide member at the outer end of the support arm when the awning is extended and for easily releasing the slide member so that it can slide freely inwardly along the associated support arm.

The slide member carries a flexible connector arm in the form of a leaf spring having a rounded leading end. The support arm has an end cap with a catch system formed thereon adapted to releasably connect the connector arm to the end cap. A cam surface in the catch system yieldingly urges the spring bar laterally as it engages the surface so that once the catch and the connector are operatively interconnected, the spring bar yieldingly retains the operative connection. To release the slide member from the catch on the support arm, the leading end of the connector arm is merely shifted laterally against the spring bias to release the interconnection between the connector arm and the catch so that the slide member is free to slide along the length of the support arm to permit retraction of the awning.

Other aspects, features and details of the present invention can be more completely understood by reference to the following detailed description of a preferred embodiment, taken in conjunction with the drawings and from the appended claims.

BRIEF DESCRIPTION OF THE DRAWINGS

FIG. 1 is a fragmentary isometric view of a travel trailer having a retractable awning incorporating the present invention extended from a side wall thereof.

FIG. 2 is a fragmentary front elevation of the travel trailer as shown in FIG. 1.

FIG. 3 is a fragmentary front elevation similar to FIG. 2 with the awning in a retracted position.

DESCRIPTION OF THE PREFERRED EMBODIMENT

Figure 4:
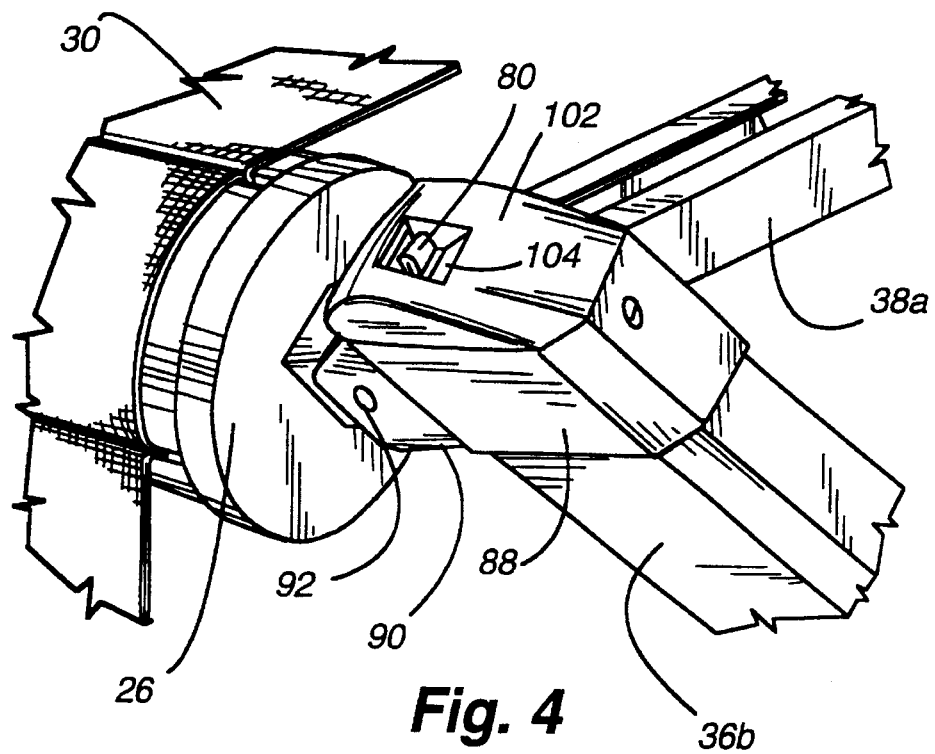
FIG. 4 is an enlarged fragmentary isometric view showing the interconnection of a support arm, rafter arm and one end of the roll bar with the awning in an extended position.

A retractable awning 20 incorporating the slide system of the present invention is best shown in FIGS. 1 through 3 mounted on a vertical side wall or support surface 22 of a travel trailer 24. The awning 20 includes a roll bar 26 to which the outer edge 28 of an awning canopy 30 is attached with the inner edge 32 of the canopy being secured to the side wall 22 of the travel trailer by a conventional mounting rail 34. The roll bar is supported at opposite ends by pairs of support and rafter arms 36 and 38 respectively. An inner end 40 of each support arm 36 is pivotally and releasably secured to the support surface in a conventional manner with an outer end 42 supporting one end of the roll bar.

Figure 5:
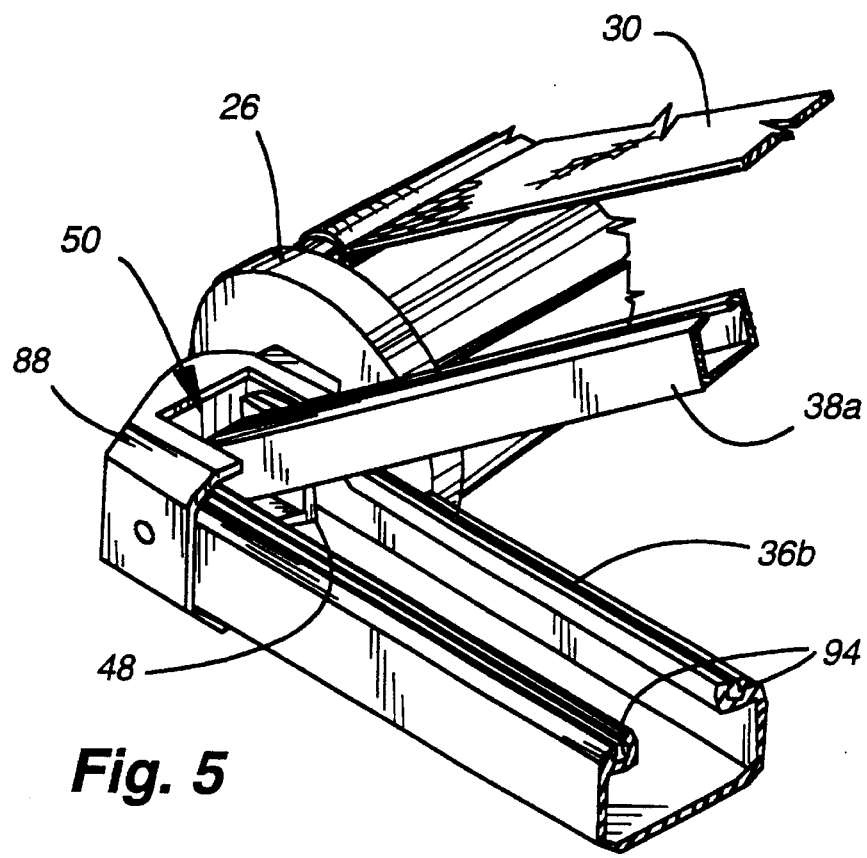
FIG. 5 is a fragmentary isometric view similar to FIG. 4 from a different angle.

Each rafter arm 38 is associated with a support arm 36 and has an inner end 44 pivotally connected to the support surface 22 at a location in vertical alignment above the connection of the support arm to the support surface. The outer end 46 of the rafter arm is connected to a slide member 48 forming a portion of the slide system 50 of the present invention and is adapted to be slidably moved along the length of the support arm in preparation for moving the awning between the extended position shown in FIG. 1 and the retracted position shown in FIG. 3. Both the support arms and the rafter arms are telescopically formed so as to be extendable along their length and the support arm is preferably channel shaped in cross section (FIG. 5) so as to receive in nested relationship, the associated rafter arm when the awning is in the retracted position of FIG. 3

The roll bar 26 may be of the type described in U.S. Pat. No. 4,819,706 issued on Apr. 18, 1989 which is of common ownership with the present application. The roll bar therefore includes a spring biasing system that biases the roll bar and the awning components toward the retracted position of the awning. A control system is included in the awning which is selectively adjustable between two positions. In the first position, the roll bar is allowed to rotate in one direction but prohibited from rotating in the opposite direction while in a second position rotation is permitted in the opposite direction while being prohibited in the first direction.

Figure 8:
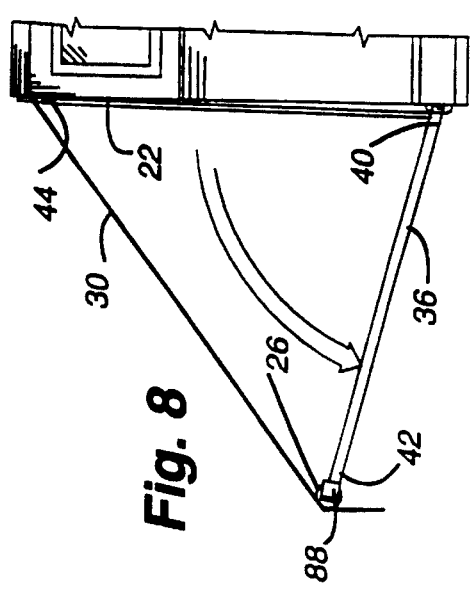
FIG. 8 is a fragmentary side elevation operational view showing the awning canopy fully extended but with the rafter arms in a retracted position.

Typically when the awning 20 is moved from the retracted position of FIG. 3 to the extended position of FIG. 1, the roll bar 26 is allowed to be moved away from the supporting surface 22 by pivoting the support arms 36 about their connection to the support surface as seen best in FIG. 8. After this step, the awning canopy 30 is fully extended even though the roll bar 26 is disposed at a lower elevation than when the awning assumes the fully extended position of FIGS. 1 and 2. As will be appreciated in FIG. 8, even though the support arms have been pivoted outwardly until the awning canopy is completely unrolled from the roll bar, the rafter arms 38 remain in a vertical orientation with the outer ends 46 of the rafter arms disposed adjacent to the inner ends 40 of the support arms. The outer ends of the rafter arms are then slid along the length of the support arms until they reach the outer ends 42 of the support arms (FIG. 9) where they are releasably locked in place with the slide system 50 of the present invention which will be described in more detail later.

As mentioned previously, both the rafter arms 38 and the support arms 36 are telescopically extendable along their length and therefore include lock systems (not shown) for locking the telescoping components of the arms at selected longitudinal positions. While moving the awning into the extended position in accordance with the aforedescribed steps, the telescoping components of both the support arms and the rafter arms are left free for longitudinal sliding movement relative to each other. After the outer ends 46 of the rafter arms have been slid to the outer ends 42 of the associated support arms, and interconnected, the length of the rafter arms are fixed with the lock systems thereon. The support arms are then longitudinally extended until the roll bar 26 assumes the elevation desired for the final disposition of the extended awning. In this position, the length of the support arms are fixed with the associated lock systems. After fixing the length of the support arms, the awning is fully extended and braced in the position illustrated in FIGS. 1 and 2 even though as previously mentioned, since the inner ends 40 of the support arms are releasably connected to the support surface 22, they can be removed from the support surface and moved into vertically underlying relationship with the roll bar so as to be supported on a ground surface (not shown) if desired. Of course, the length of the support arm can be adjusted to selectively raise or lower the height of the roll bar.

Figure 13:
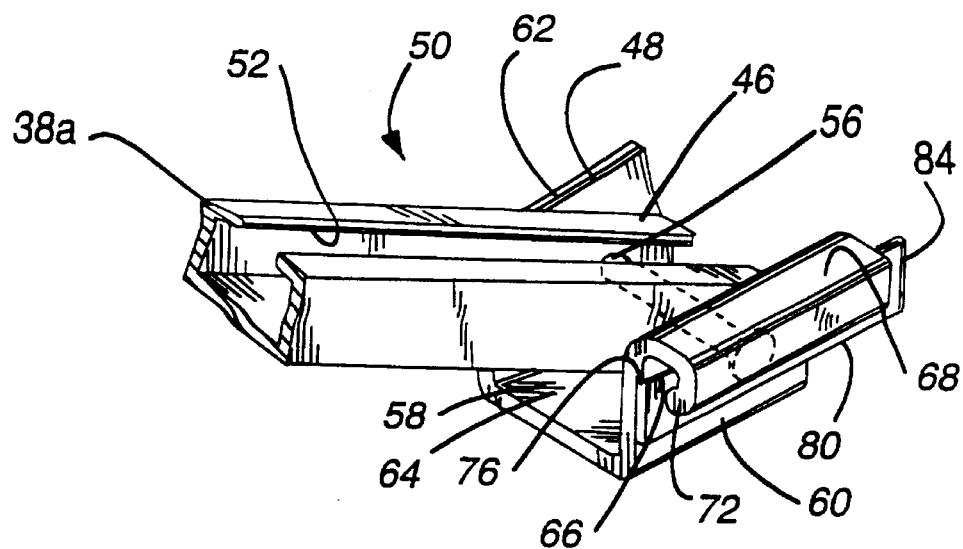
FIG. 13 is a fragmentary isometric showing the outer end of a rafter arm with a slide member pivotally connected thereto.
Figure 14:
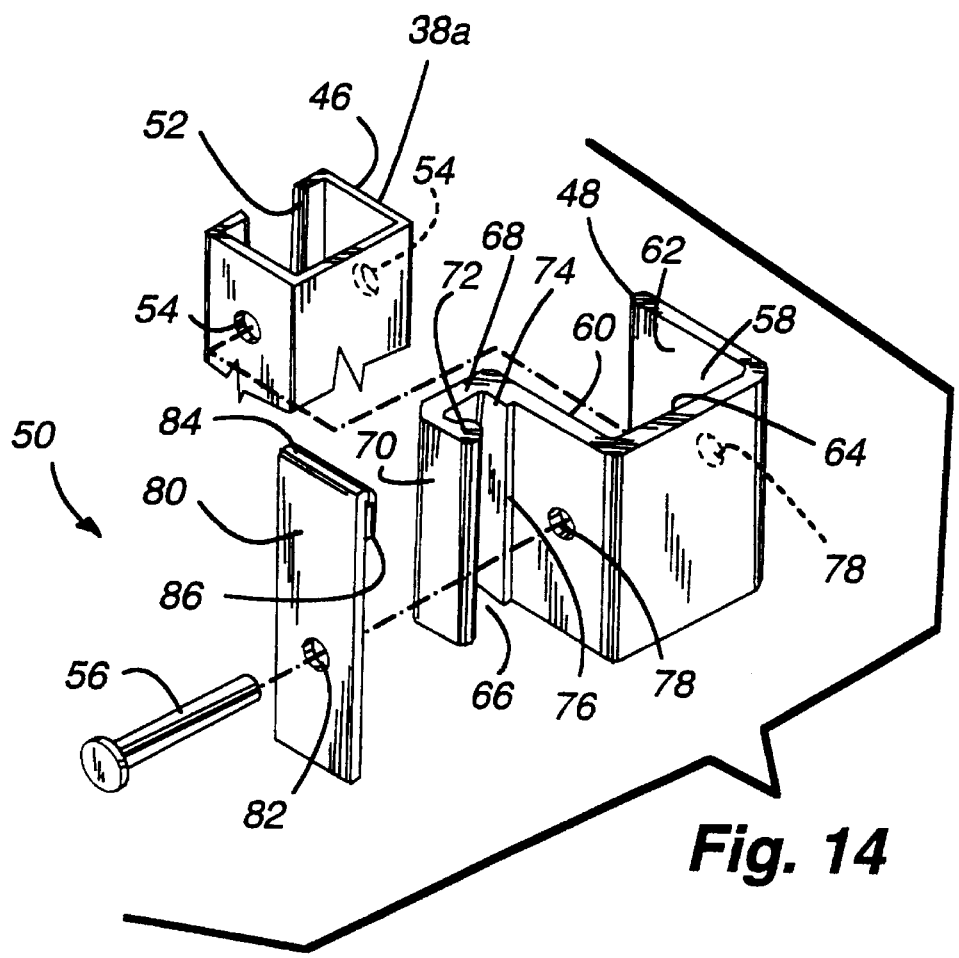
FIG. 14 is an exploded fragmentary isometric illustrating the connection of the outer end of a rafter arm to a slide member.

As mentioned previously, the slide system 50 of the present invention interconnects the outer end 46 of a rafter arm 38 with an associated support arm 36 and allows the outer end of the rafter arm to slide along the length of the support arm and be releasably and selectively retained at the outer end 42 of the support arm. The slide system includes the slide member 48 and its connection to the outer end of a rafter arm is probably best illustrated in FIGS. 13 and 14. It will there be seen that the outer telescoping component 38a of a rafter arm is of somewhat tubular or channel shaped configuration having a longitudinal slot 52 along one longitudinal side. The outer end 46 of the rafter arm has aligned openings 54 in opposing side walls which are adapted to pivotally receive a pivot pin 56 that interconnects the slide member 48 to the rafter arm.

The slide member 48 itself can be seen to include a large channel 58 defined by opposing side walls 60 and 62 and a bottom wall 64 and an inverted smaller channel 66 formed along the top edge of the side walls 60. The smaller channel is defined by a top wall 68 and a free side wall 70 with the terminal or lower edge of the free side wall having an enlarged bead 72 formed therealong. The side wall 60 of the large channel 58 forms a side wall of the inverted smaller channel 66. The side wall 60 has a thickened section 74 defining a downwardly directed shoulder 76. A pair of aligned openings 78 are provided in the side walls 60 and 62 of the larger channel which are adapted to be aligned with the openings 54 in the rafter arm.

A flat elongated resilient connector arm 80 having an opening 82 therethrough is adapted to be positioned with its trailing end against the shoulder 76 in a confronting relationship with the outside of the side wall 60 of the large channel 58. The arm 80 is secured to the side wall 60 with the pivot pin 56. The connector arm is preferably in the form of a leaf spring so as to be flexible laterally of the slide member 48. A leading end of the connector arm is folded back upon itself so as to define a rounded leading end 84 and a rearwardly directed shoulder 86. The shoulder 86 assists in releasably connecting the slide member to the outer end of the associated support arm 36 in a manner to be described later.

Figure 7:
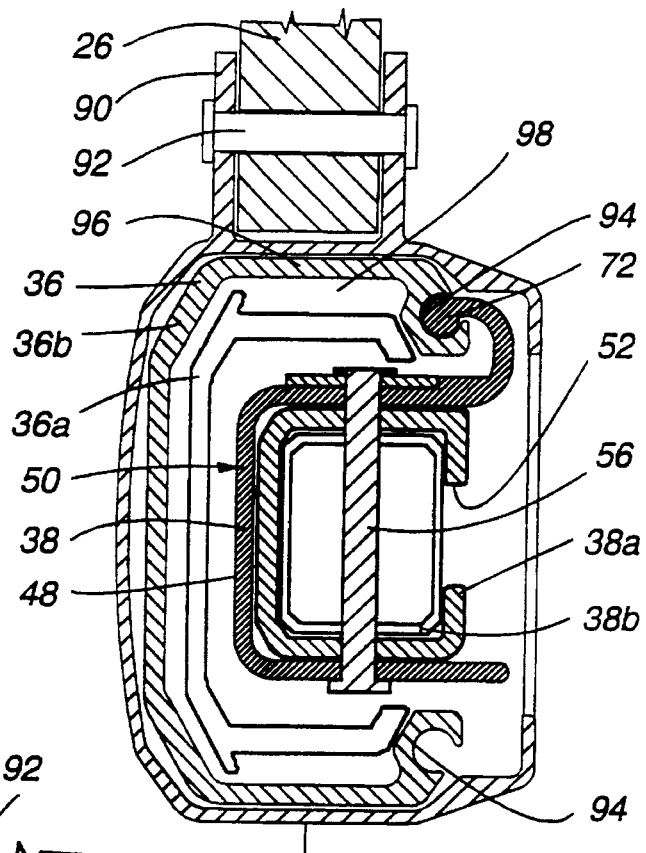
FIG. 7 is an enlarged fragmentary section taken along line 7—7 of FIG. 3.

FIG. 7 is a cross-sectional view illustrating the slide member 48 attached to a rafter arm 38 and operatively incorporated into an associated support arm 36. As mentioned previously, both the support arms and the rafter arms have telescoping components. In FIG. 7, it will be appreciated that the smaller or inner telescoping rafter arm component 38b is of substantially square tubular construction and is slidably received within the channel shaped outer telescoping rafter arm component 38a to which the slide member is connected as described previously. Similarly, the inner telescoping component 36a of the support arm is of channel shaped configuration and is slidably received within the outer channel shaped telescoping component 36b of the support arm. The outer telescoping component 36b of the support arm is in turn secured at its outer end 42 with set screws to an end cap 88 which has a bifurcated connection portion 90 secured to the end of the roll bar 26 with a connector pin 92. The end cap thereby closes the otherwise open outer end 42 of the support arm so that the rafter arm and connected slide member cannot move beyond the outer end of the support arm.

As probably best seen in FIGS. 5, 7, 11 and 12, the outer telescoping component 36b of the support arm 36 has longitudinally extending grooves 94 along the free edges of each lateral side wall 96 with the side walls defining a space therebetween that receives a rafter arm 38. The side walls 96 turn inwardly at their free edges thereby defining a pocket 98 in the outer telescoping support arm component 36b in which the inner telescoping component 36a of the support arm is confined.

The bead 72 formed on the free side wall 70 of the slide member 48 is slidably received and confined within one of the grooves 94 formed in the side walls of the support arms. The grooves and the beads are sized so as to mate with each other allowing the slide member to slide along the groove but preventing its removal therefrom. It will also be appreciated that the bead connection with the groove is a tongue-in-groove connection which allows some pivotal movement of the slide member relative to the support arm about the groove in which the bead is disposed. The purpose for the pivotal movement will become apparent with the description that follows.

It should be appreciated that the minimum length of a rafter arm 38 is such that the outer end 46 of the rafter arm will always be within the outer telescoping component 38b of the support arm 38 and therefore the slide member 48 on the outer end of the rafter arm cannot be removed from the innermost end of the outer telescoping component of the support arm. However, the slide member is free to slide along the outer telescoping component of the support arm during extension and retraction of the awning.

. The end cap 88 has a catch 100 formed in an end wall 102 thereof with the catch having a recess or depression 104 formed in the outer surface of the end wall of the cap. The depression 104 defines an opening 106 through the cap and a depressed wall 108. The depressed wall has an exposed lip 110 adjacent to the opening 106 and further defines a cam surface 112 in the interior of the end cap. The cam surface is in alignment with the resilient connector arm 80 on the slide member 48 such that movement of the slide member toward the end cap will cause the flat connector arm to engage the cam surface.

Figure 6:
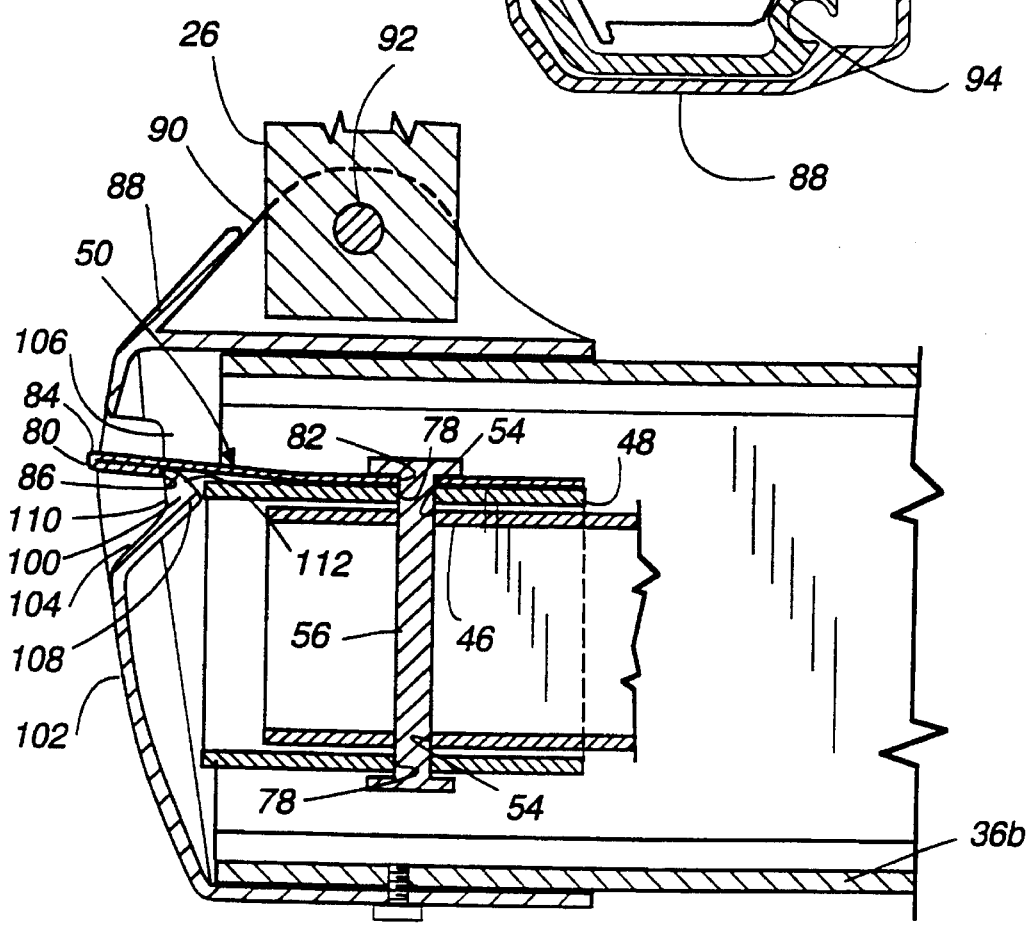
FIG. 6 is an enlarged fragmentary section taken along line 6—6 of FIG. 2.

The catch 100 in the end cap 88 is probably best seen in FIGS. 4 and 6. The catch of course is adapted to cooperate with the flat connector arm 80 in releasably securing the slide member 48 to the outer end 42 of the support arm 36. In operation, as the slide member on the outer end 46 of a rafter arm 38 is moved along the length of the support arm toward the outer end of the support arm, the rounded leading end 84 of the connector arm 80 ultimately engages the cam surface 112 on the depressed wall 108 of the end cap. The cam surface deflects the connector arm laterally until the inverted leading end of the connector arm extends beyond the exposed lip 110 of the depressed wall at which point the bias of the connector arm urges the arm 80 in a reverse lateral direction from which it was deflected so that the rearwardly directed shoulder 86 on the connector arm overlies the exposed lip to releasably connect the slide member to the end cap on the support arm. Of course, to release the connection, it is only necessary for one to insert a finger into the depression 104 in the end cap and push the connector arm 80 against its bias until the shoulder 86 is released from the lip 110 and thereafter urge the connector arm rearwardly to release the connection. After the connector arm moves rearwardly with the slide member 48, it becomes disengaged from the lip allowing the slide member to move freely in a reverse direction such as when the awning is being retracted.

Figure 9:
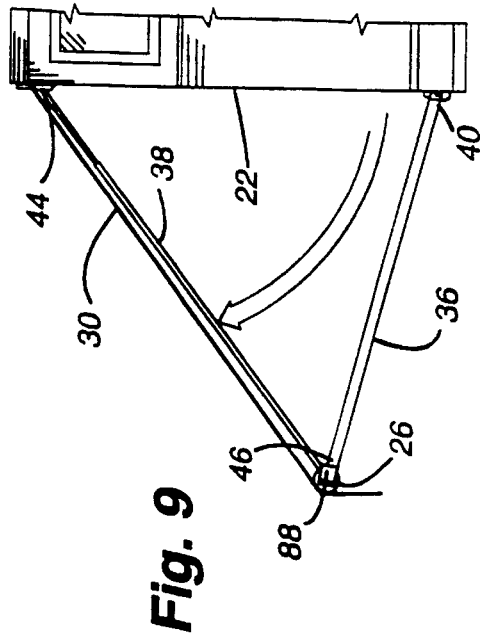
FIG. 9 is a fragmentary side elevation similar to FIG. 8 with the slide member on the rafter arms connected to the outer ends of the support arms.
Figure 10A:
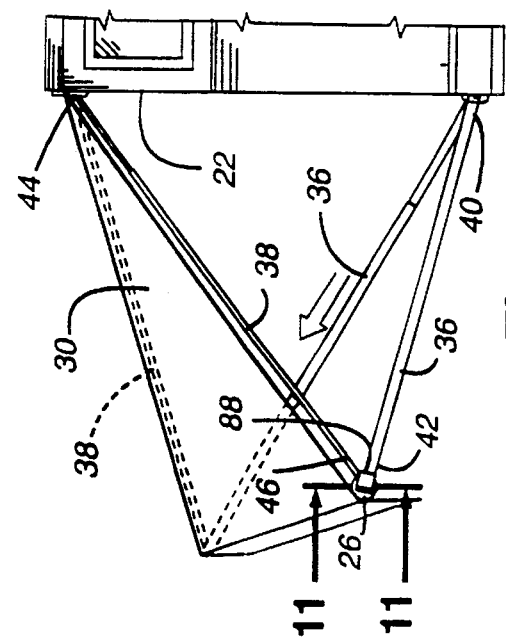
FIG. 10A is a fragmentary front elevation showing the awning in the position of FIG. 10.
Figure 10:
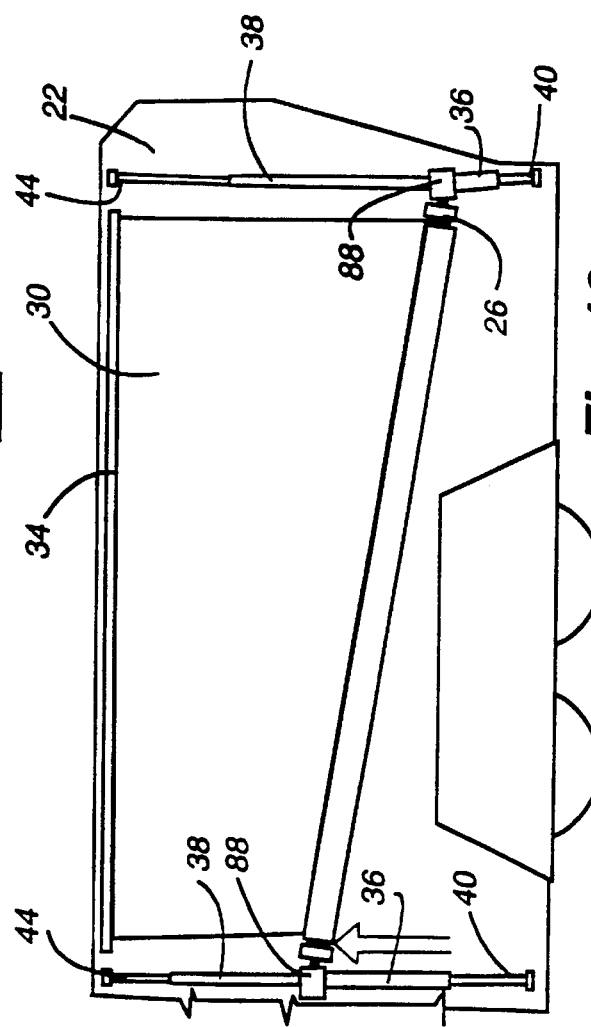
FIG. 10 is a fragmentary side elevation of the travel trailer of FIG. 1 showing the awning in a partially extended position to illustrate the misalignment of a pair of associated support and rafter arms.
Figure 12:
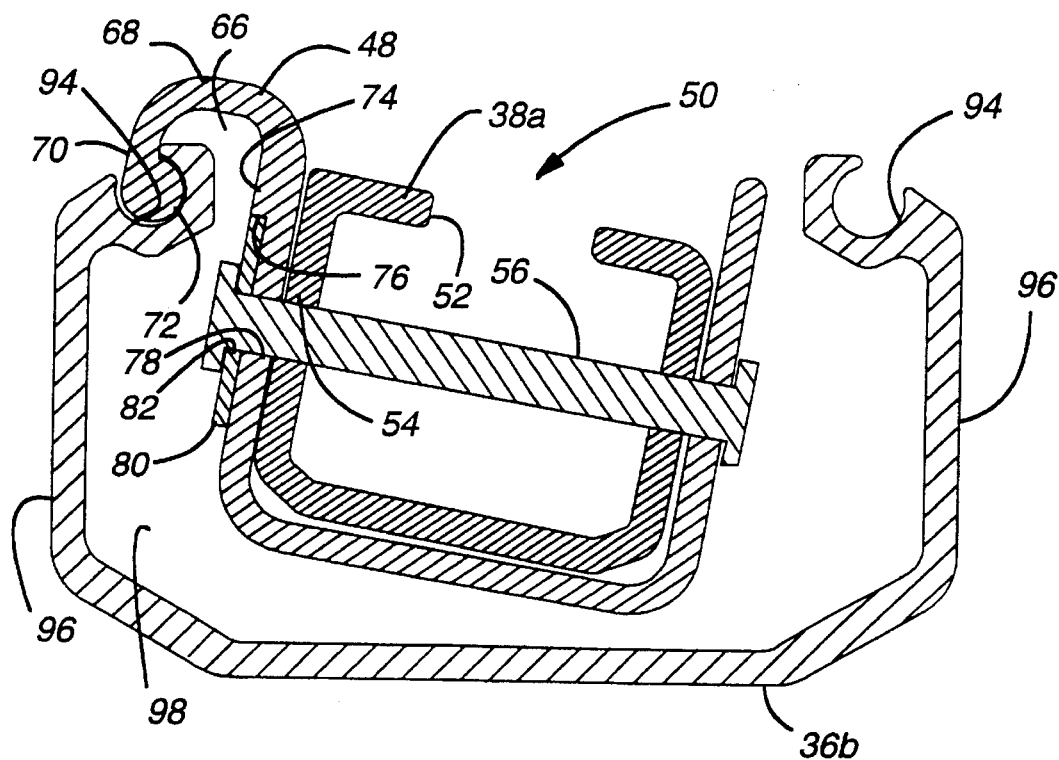
FIG. 12 is a schematic section similar to FIG. 11 showing a rafter arm at a different angular orientation relative to a support arm than that illustrated in FIG. 11.
Figure 11:
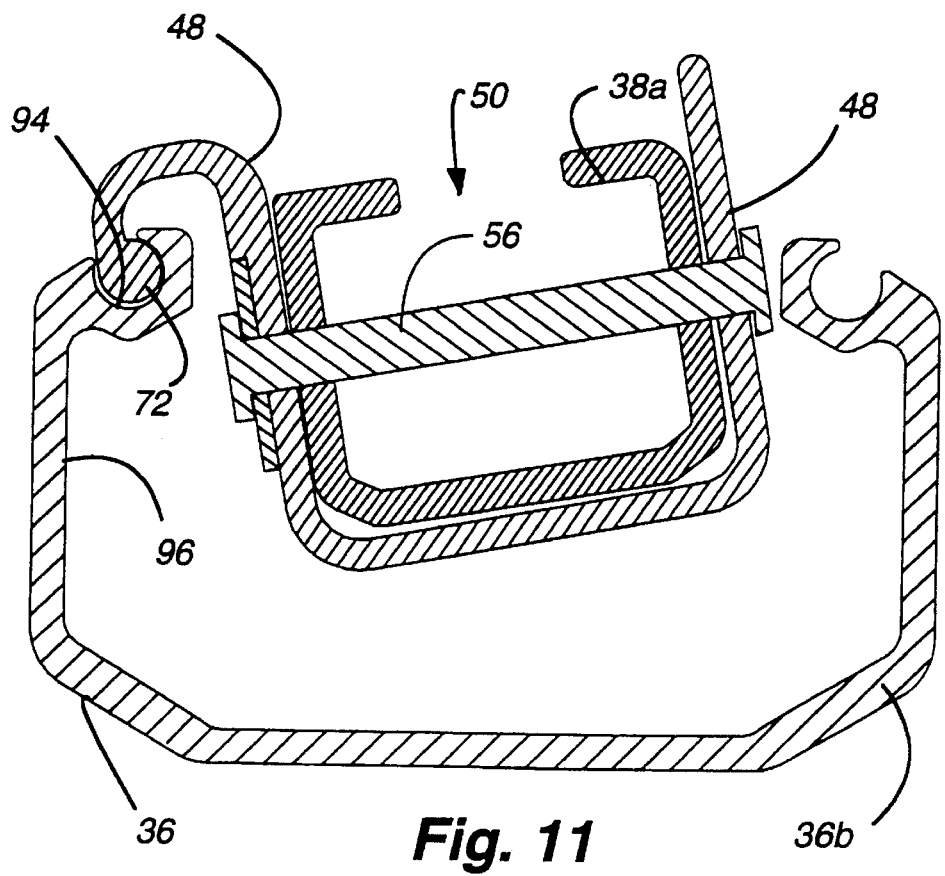
FIG. 11 is an enlarged schematic section taken along line 11—11 of FIG. 10A.

The pivotal connection of the slide member 48 to the outer telescoping component of the support arm 36 prevents the awning from being damaged when it is being extended or retracted and one end of the awning is moved at a different time than the opposite end. In other words and for purposes of example, if there is only one operator of the awning, and the awning is being moved from the retracted to the extended position as illustrated in FIGS. 8 through 10, after the support arms have been pivoted outwardly to allow the roll bar 26 to unroll the awning canopy 30 (FIG. 8) and the outer ends 46 of the rafter arms 38 have been slid along the support arms until they are releasably secured at the outer end of the support arm (FIG. 9), one support arm is extended while elevating the roll bar to the desired elevation as shown in FIGS. 10 and 10A. As will be appreciated in FIG. 10, when the left end of the roll bar is elevated while the right end is not, the rafter arm and support arm at the right end become skewed. The skewing of the rafter and support arms is permitted due to the pivotal connection of the slide member to the support arm thereby avoiding stress in this connection. Typical prior art systems have not provided the pivotal connection thereby placing a great deal of strain in the connection ultimately causing damage to the awning. The advantages of the pivotal connection are best seen in FIGS. 11 and 12 wherein it will be appreciated that the rafter arm can be skewed relative to the associated support arm without stressing the hardware for the awning at this connection.

It will be appreciated from the above description that a slide system 50 for interconnecting the outer end of a rafter arm 38 to a support arm 36 has been described that not only permits skewing of rafter arms relative to their associated support arms to avoid damage to the connection between the two arms but also provides a new and improved automatic latch system for releasably securing the outer end of a rafter arm to the outer end of a support arm with quick release capability. The slide system of the invention thereby provides a distinct improvement over prior art systems in facilitating the extension and retraction of a retractable awning whether or not there is more than one operator available to move the awning between the relative positions.

Although the present invention has been described with a certain degree of particularity, it is understood that the present disclosure has been made by way of example, and changes in detail or structure may be made without departing from the spirit of the invention, as defined in the appended claims.

The invention claimed is:

1. In a retractable awning mounted on a substantially vertical support surface for movement between extended and retracted positions, said awning having a roll bar about which a canopy can be rolled, a pair of channel-shaped support arms having a longitudinal side edge, each support arm defining a longitudinal channel therein, one end of each support arm being operatively connected to an associated end of the roll bar and having another end for contacting the support surface, and a pair of rafter arms having one end operatively secured to said support surface and the other end slidably secured to an associated one of said support arms, whereby each of said rafter arms can be longitudinally received in the channel of an associated support arm, the improvement comprising, a slide member attached to said other end of said rafter arms, and a pivotal connector system between said slide member and said longitudinal side edge of the associated support arm, said connector system permitting said slide member to be longitudinally movable along said associated support arm while permitting relative pivotal movement between said slide member and the associated support arm.

2. In the awning of claim 1, said pivotal connector being connected to said associated support arm only along said longitudinal side edge.

3. In the awning of claim 1, said connector system permitting pivotal movement of the slide member about said longitudinal side edge.

4. In the awning of claim 3, wherein said connector system is a tongue-in-groove type connector system.

5. In the awning of claim 4 further including a groove along said longitudinal side edge of each support arm and a rib formed on said slide member, said rib being slidably retained in said groove.

6. In the awning of claim 5 further including a pivot system interconnecting said slide member and the associated rafter arm.

7. In the awning of claim 5 wherein said pivot system permits pivotal movement of the rafter arm relative to the slide member about an axis transverse to the length of the rafter arm.

8. In a retractable awning mounted on a substantially vertical support surface for movement between extended and retracted positions, said awning having a roll bar about which a canopy can be rolled, a pair of support arms with one end of each support arm being operatively connected to an associated end of the roll bar and having another end for contacting the support surface, a pair of rafter arms having one end operatively secured to said support surface and the other end slidably secured to an associated one of said support arms and a pair of slide members interconnecting said other end of a rafter arm with an associated support arm, the improvement comprising a resilient connector arm mounted on each of said slide members, and a catch including a cam surface on the associated support arm such that upon sliding movement of the slide member toward and into engagement with said catch, the resilient arm is cammed into releasable locking relationship with said catch to releasably retain the associated rafter and support arms in the extended position of the awning.

9. In the awning of claim 8 wherein said resilient arm has a leading end engageable with said cam surface and means on said leading end of said resilient arm for operatively engaging and being releasably retained by said catch.

10. In the awning of claim 9 wherein said catch and cam surface are defined on a wall formed on the associated support arm, said cam surface being on one side of said wall and the catch on another side of said wall, said cam surface being adapted to engage said resilient arm as said means approaches and engages said cam surface such that said connector on the resilient arm can be releasably caught on said catch.

11. In the awning of claim 10 wherein said resilient arm is a flat strip having said leading end rounded.

12. In the awning of claim 11 wherein said means on said resilient arm is a shoulder adjacent to said leading and of said arm.

* * * * *